(12) United States Patent
Habermann (10) Patent No.: US 9,052,046 B2
(45) Date of Patent: Jun. 9, 2015

(54) COOLING SYSTEM FOR A COMBUSTION ENGINE

(75) Inventor: Rolf Habermann, Bergen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 856 days.

(21) Appl. No.: 13/133,865

(22) PCT Filed: Dec. 2, 2009

(86) PCT No.: PCT/US2009/066323
§ 371 (c)(1),
(2), (4) Date: Jun. 9, 2011

(87) PCT Pub. No.: WO2010/068529
PCT Pub. Date: Jun. 17, 2010

(65) Prior Publication Data
US 2011/0232591 A1  Sep. 29, 2011

(30) Foreign Application Priority Data
Dec. 10, 2008  (DE) .................... 10 2008 061 462

(51) Int. Cl.
| F01P 7/14 | (2006.01) |
| F16L 37/098 | (2006.01) |
| F28F 9/02 | (2006.01) |
| F28F 27/02 | (2006.01) |
| F01P 11/04 | (2006.01) |

(52) U.S. Cl.
CPC ............. *F16L 37/098* (2013.01); *F01P 11/04* (2013.01); *F28F 9/0251* (2013.01); *F28F 9/0258* (2013.01); *F28F 27/02* (2013.01)

(58) Field of Classification Search
CPC ........ F01P 7/14; F16L 37/144; F16L 37/0987
USPC ................. 123/41.09; 285/319, 305, 921
See application file for complete search history.

(56) References Cited

U.S. PATENT DOCUMENTS

| 753,096 | A | * | 2/1904 | Osteen ...................... 285/283 |
| 5,219,188 | A | * | 6/1993 | Abe et al. .................. 285/93 |
| 5,228,724 | A | * | 7/1993 | Godeau ..................... 285/93 |
| 5,568,946 | A | * | 10/1996 | Jackowski ................. 285/38 |
| 5,609,370 | A | * | 3/1997 | Szabo et al. .............. 285/319 |
| 5,873,610 | A | * | 2/1999 | Szabo ....................... 285/319 |
| 5,882,047 | A |   | 3/1999 | Ostrander et al. |

(Continued)

OTHER PUBLICATIONS

ISR for PCT/US2009/066323 dated Feb. 1, 2010.

*Primary Examiner* — Marguerite McMahon
*Assistant Examiner* — James Kim
(74) *Attorney, Agent, or Firm* — Lowe Hauptman & Ham LLP (57) ABSTRACT

A coolant circuit includes a first pipe segment, a second pipe segment, and a seal between the pipe segments which are displaceable relative to each other. A resilient locking tang runs parallel to the first pipe segment and has a detent element. An elongated guide portion runs parallel to and is spaced from the locking tang between the pipe segment and the locking tang. Spaced-apart arms run parallel to the second pipe segment beyond the end of this second pipe segment. An axially parallel web is configured between the arms and is fitted at its end facing the second sub-assembly with a detent shoulder which is engaged from behind by the resilient detent element when the pipe segments are plugged into each other. The resilient tang is received at a closed fit between the arms, and the elongated guide portion is guided by the arms.

17 Claims, 6 Drawing Sheets

(56) References Cited

U.S. PATENT DOCUMENTS

| | | | |
|---|---|---|---|
| 5,897,142 A * | 4/1999 | Kulevsky | 285/308 |
| 5,964,256 A * | 10/1999 | Bedi et al. | 141/83 |
| 6,539,920 B1 * | 4/2003 | Spiers | 123/456 |
| 6,857,663 B2 * | 2/2005 | Nagata et al. | 285/81 |
| 6,866,304 B2 * | 3/2005 | Kaminski et al. | 285/319 |
| 7,370,674 B2 * | 5/2008 | Doyle | 137/884 |
| 7,651,138 B2 * | 1/2010 | Feger et al. | 285/319 |
| 2003/0218334 A1 | 11/2003 | Takayanagi | |
| 2004/0232696 A1 * | 11/2004 | Andre | 285/319 |
| 2008/0168769 A1 | 7/2008 | Preimesberger et al. | |

* cited by examiner

COOLING SYSTEM FOR A COMBUSTION ENGINE

RELATED APPLICATIONS

The present application is national phase of PCT/US2009/066323 filed Dec. 2, 2009, and claims priority from German Application Number 10 2008 061 462.9 filed Dec. 10, 2008.

The present invention relates to an internal combustion engine's cooling system defined in claim 1.

It is known with respect to internal combustion engines' cooling systems to design a cooling water regulator having two sub-assemblies, one of which contains for instance contains a thermostatic valve. It is also known to make the housings of such sub-assemblies integral, these sub-assemblies mostly being made of plastic. This state of the art however incurs the drawback that if a single part should fail, all of the sub-assembly must be exchanged as a whole. This drawback wastes material and entails elaborate labor.

It is also known to manufacture said sub-assemblies individually. Conventionally one of the sub-assemblies, namely the thermostatic valve sub-assembly, is rigidly joined to the engine. When assembling that sub-assembly to the other, some alignment defects and a longitudinal play may be incurred. Such assembly is relatively complex because taking place directly at the engine.

The objective of the present invention is to create an internal combustion engine cooling system fitted with a coolant circuit where the sub-assembly to be affixed to the engine may be joined in simple manner to a further sub-assembly, whereby, following installation, the junction between these sub-assemblies shall remain in effect until the sub-assembly joined to the engine in turn shall be removed from that engine.

This problem is solved by the features of claim 1.

In the cooling system of the present invention, pipe segments of the two sub-assemblies may be plugged into each other and may be mutually displaceable, a seal being configurable between them. Moreover an elastic locking tang is configured parallel to the axis of the second pipe segment of the second sub-assembly, said tang being fitted at its free end with a detent element pointing to the pipe segment, an elongated guide portion being configured between the pipe segment and the locking tang being configured at the second pipe segment and parallel to the locking element. Parallel and mutually spaced arms are configured at the first sub-assembly and run parallel to its axis beyond its end. An axially parallel web is subtended between the arms and is fitted at its end facing the second sub-assembly with a detent shoulder that shall be engaged from behind by the locking tang when the pipe segments are plugged into one another. In that configuration terminal stops at the first and second sub-assemblies limit the plug-in displacements. The elastic tang is received at a close fit between the arms and the elongated guide portion is guided on the other web side by lateral guide faces in the arms.

Using the above cited detent or detent connection, the sub-assemblies may be connected to each other in simple manner. When a given axial play is deliberately provided along the engaged detent connection elements, the sub-assemblies to be joined to each other no longer need be accurately aligned, respectively being in precise relative positions. In especially advantageous manner the locking tang may be configured on one side of its associated sub-assembly facing the engine and to which it is mounted. Because no longer being accessible, the locking tang no longer can be disengaged following affixation. Nevertheless installation is feasible because the displaceable sub-assembly can be easily plugged onto the other sub-assembly screwed onto the engine part.

The design of the present invention furthermore offers the advantage that the sub-assembly directly connected to the engine part can be connected to other, arbitrary sub-assemblies provided the connecting/detent elements be complementary to those of the firmly affixed sub-assembly. Illustratively a plain water conduit, a cooling water regulator or the like may be plugged in a tight fit into/onto the sub-assembly joined to the engine. Consequently the snap-in/detent connection of the present invention allows modular construction in a way that, depending on the structure of the coolant circuit, various sub-assemblies may be firmly plugged together with that sub-assembly which is firmly affixed to the engine.

In a further embodiment of the present invention, each arm is fitted with a terminal zone in a detent connection zone at the free end, said zones being configured mutually oppositely. Lateral guide faces of the guide zone each comprise second detent connection zones cooperating with the first detent connection zone assure locking when the segments are plugged into each other. The projecting flexible arm portions facilitate joining the sub-assemblies during the plug-in phase before the guide portion has been inserted between said arms.

The invention is elucidated below by illustrative embodiment modes and in relation to the appended drawings.

Figure 1:
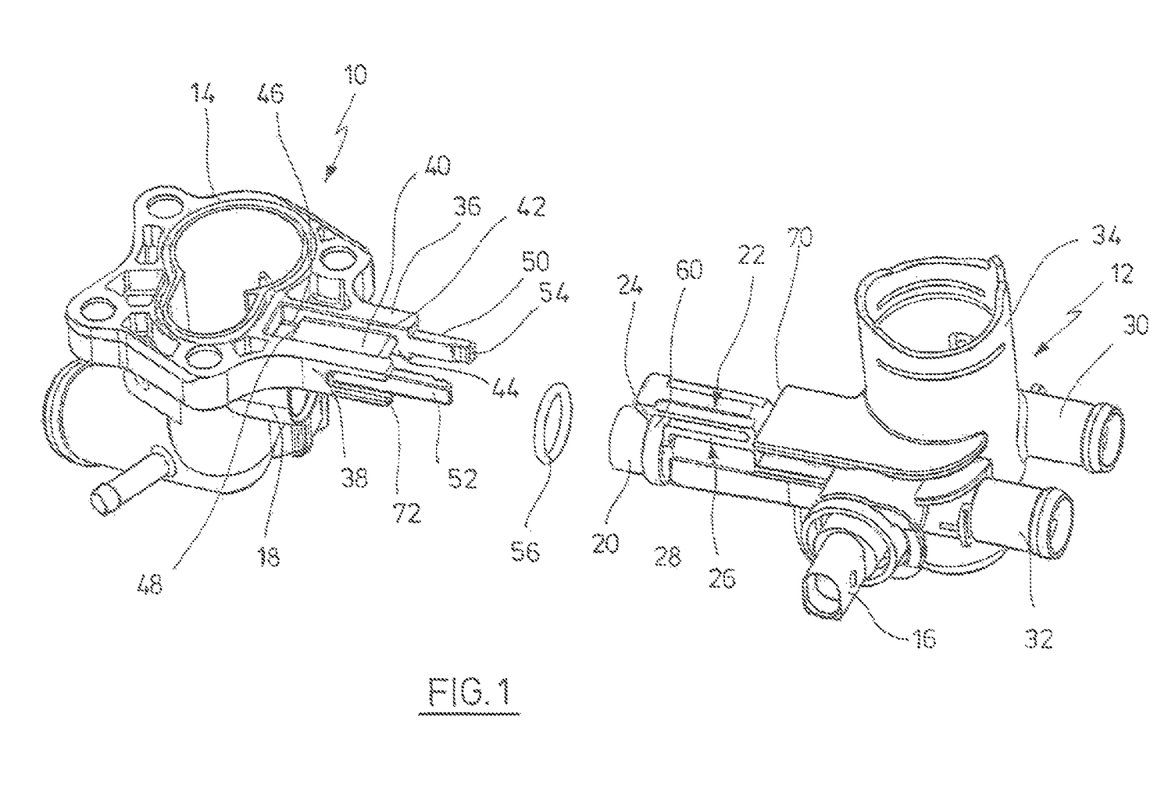
FIG. 1 shows a perspective of two sub-assemblies of the cooling system of the invention before they are joined to each other.

FIG. 1 shows a first sub-assembly 10 and a second sub-assembly 12 of a coolant circuit—not shown in detail—of an internal combustion engine's cooling system. Illustratively the sub-assembly 10 is a thermostatic valve. The sub-assembly 10 is affixed by a flange to an omitted engine part. The sub-assembly 10 is firmly affixed by a flange 14 to an omitted engine part. Illustratively the sub-assembly 12 is a cooling water regulator fitted with a stub 16 allowing connection to a rotary drive. The two sub-assemblies 10, 12 are meant to be connected to each other to be a flow hookup. This hookup should be implemented when the sub-assembly 10 already is firmly affixed to the internal combustion engine. The sub-assembly 10 comprises a pipe segment 18 which can be plugged together with a pipe 20 segment of the sub-assembly 12. The designs of the sub-assemblies are elucidated below. A resilient tang 22 integral with the sub-assembly 12 runs above the pipe segment 20 spaced from and parallel to the axis of said segment 20. The resilient tang 22 is fitted at its free end with a hook-shaped detent element 24. A guide 26 also is integral with the pipe segment 20 and also runs parallel to the axis of said segment 20 at a spacing from said segment respectively at a spacing from the resilient tang 22. The guide 26 is angled at 28 at which site it joins the pipe segment 20. At its end opposite the pipe segment 20, the sub-assembly 12 furthermore is fitted with additional pipe segments 30, 32 which are part of the cooling circuit, also an additional upward-running stub 34. However the cooling water regulator 12, being known, is not discussed further herein.

A flat web 40 is configured between two arms 36, 38 parallel to each other and to the axis of the pipe segment 18 and is integrated in the sub-assembly 10. First guide faces 42 and second guide faces 44 are constituted above respectively below said web at the mutually facing sides of the arms 36, 38. A recess 46 constituting a shoulder 48 is configured in the rear region opposite the free ends of the web 40.

At their free ends, the said arms are fitted with projecting arm portions 50, 52 that are relatively slightly more resilient. These arms are fitted with first detent connection elements 54 at their mutually facing sides at the free end.

When the pipe segments 18, 20 are plugged into each other, the resilient arm portions 50, 52 will slide along the corresponding sides of the guide portion 26. After a given displacement, the detent element 24 slides on the top side of the web 40 and the guide faces of the arms 36, 38 are guided on the sides of the guide portion 26 until said detent element 24 engages from behind the shoulder 48. At the instance of said engagement, the pipe segments become plugged into each other. An annular seal 56 ensures proper sealing. This feature is elucidated further below.

Figure 2:
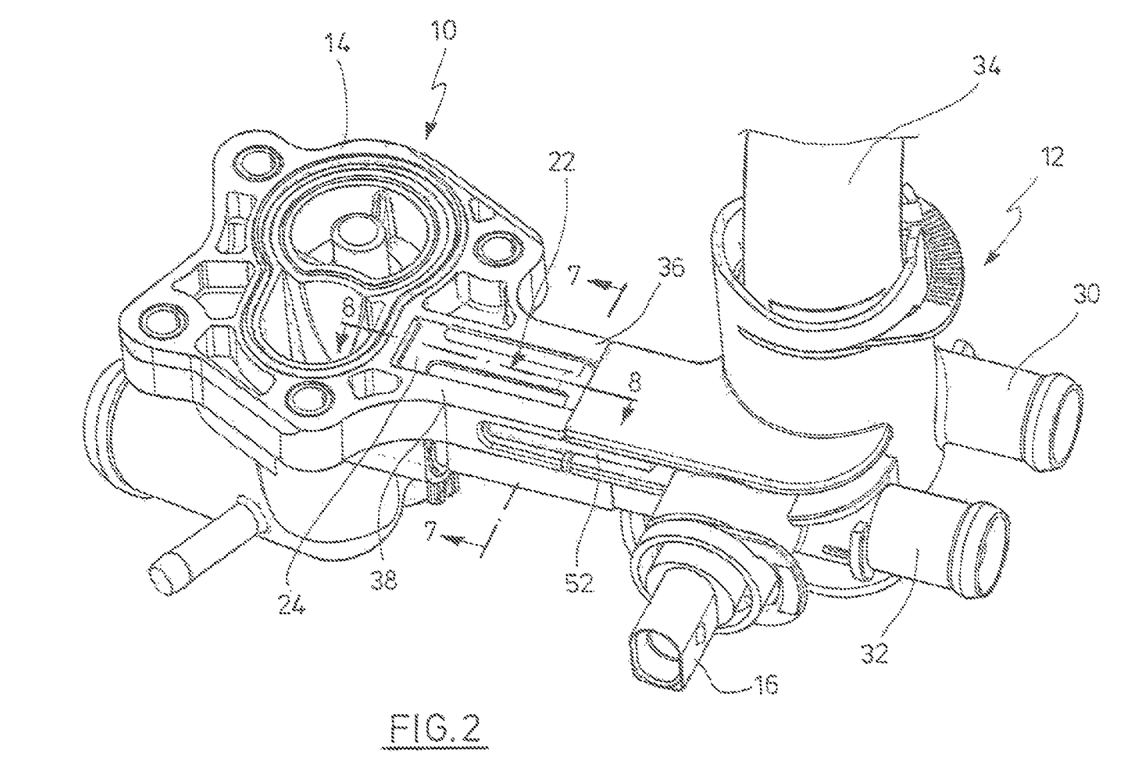
FIG. 2 shows the sub-assemblies of FIG. 1 when plugged into each other.

FIG. 2 shows the sub-assemblies of FIG. 1 when finally joined. The resilient tang 22 is affixed directly to the flange 14 next to the engine part. This connection accordingly cannot be disengaged by bending away the tang 22.

Figure 3:
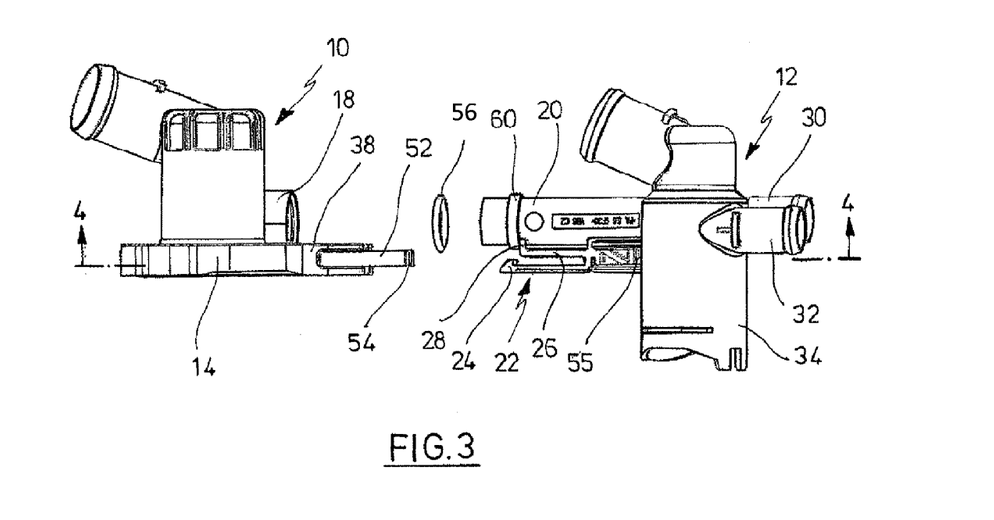
FIG. 3 is a sideview of the sub-assemblies of FIG. 1 but rotated by 180°.

The sub-assemblies 10 and 12 are again shown in sideview in FIG. 3 but exchanged in place by 180°. FIG. 3 also shows a mating connection element 54 for the flexible terminal portion 52 of the arm 38. A corresponding mating detent connection element 55 is situated at the opposite side. Said elements cooperate with the detent connection elements 54 when the sub-assemblies have been fully plugged together.

Figure 4:
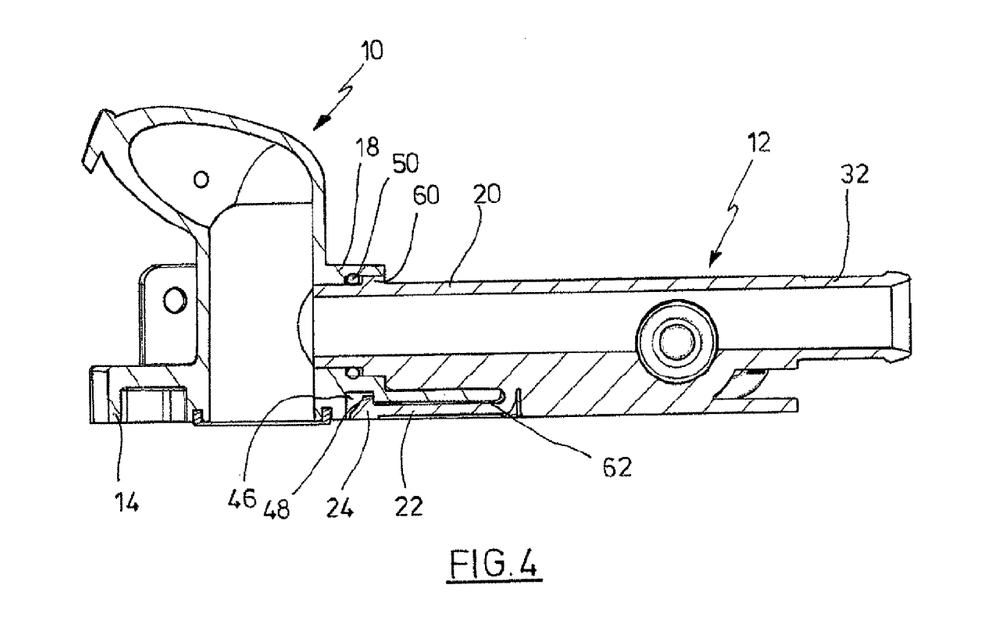
FIG. 4 is a section of the structure of FIG. 3 along line 4-4, however in the joined state of the sub-assemblies.
Figure 5:
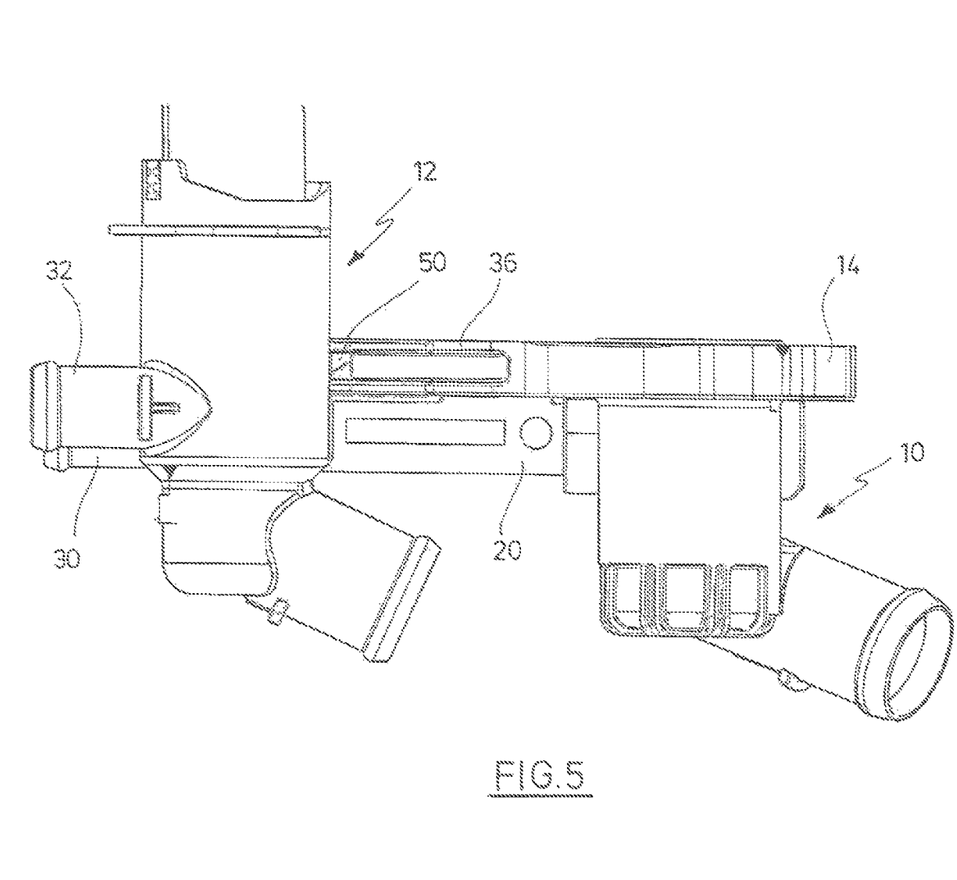
FIG. 5 is a sideview of the joined sub-assemblies of FIG. 2 when rotated by 180°.
Figure 6:
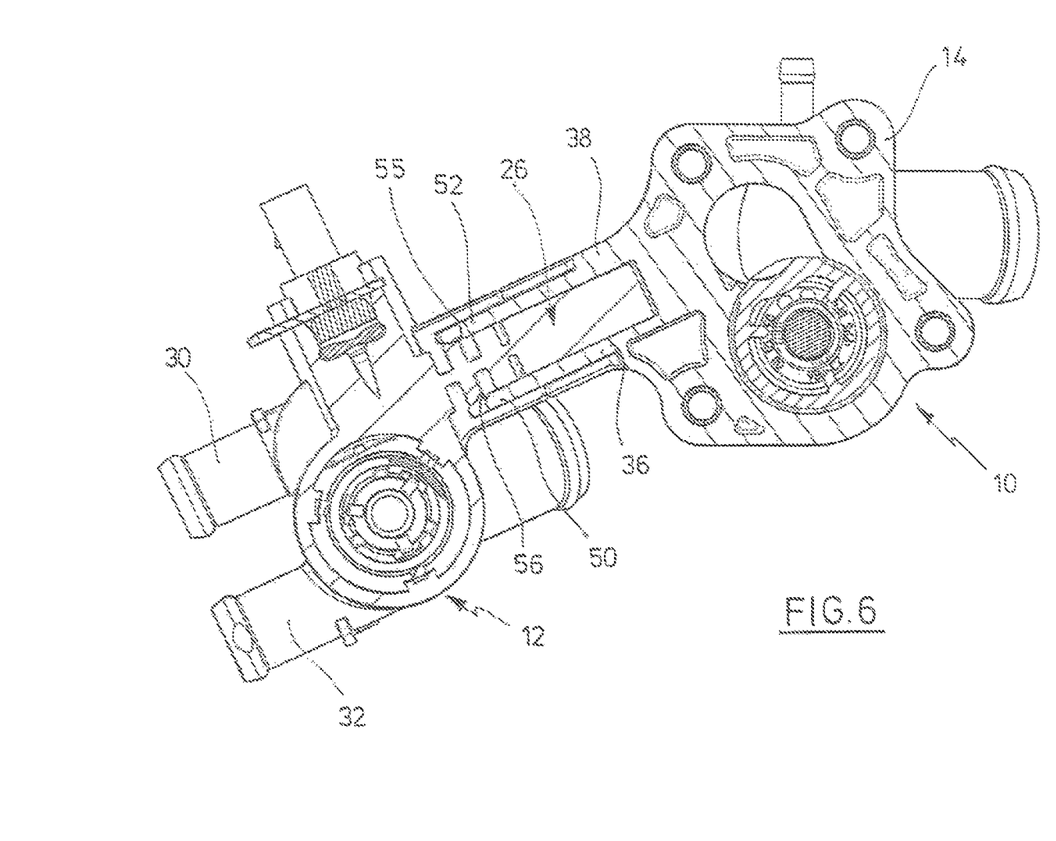
FIG. 6 is a sectional view of the structure of FIG. 5 along line 6-6.
Figure 7:
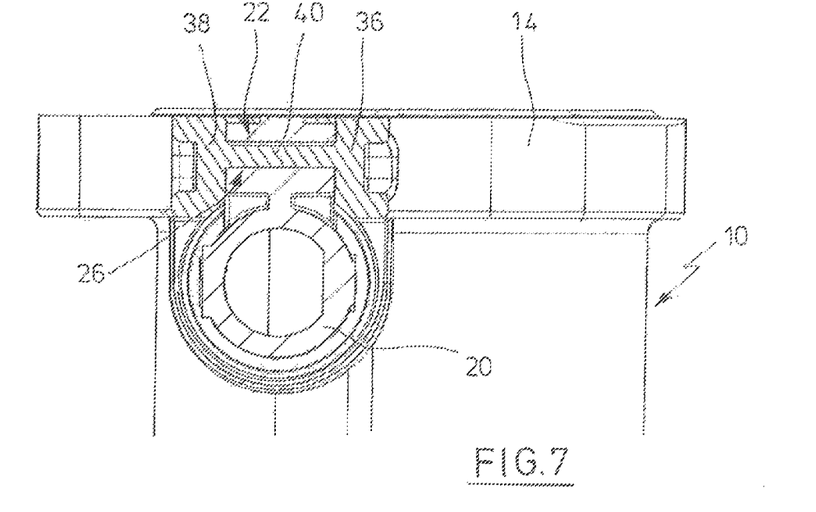
FIG. 7 is a section of the structure of FIG. 2 along line 7-7.
Figure 8:
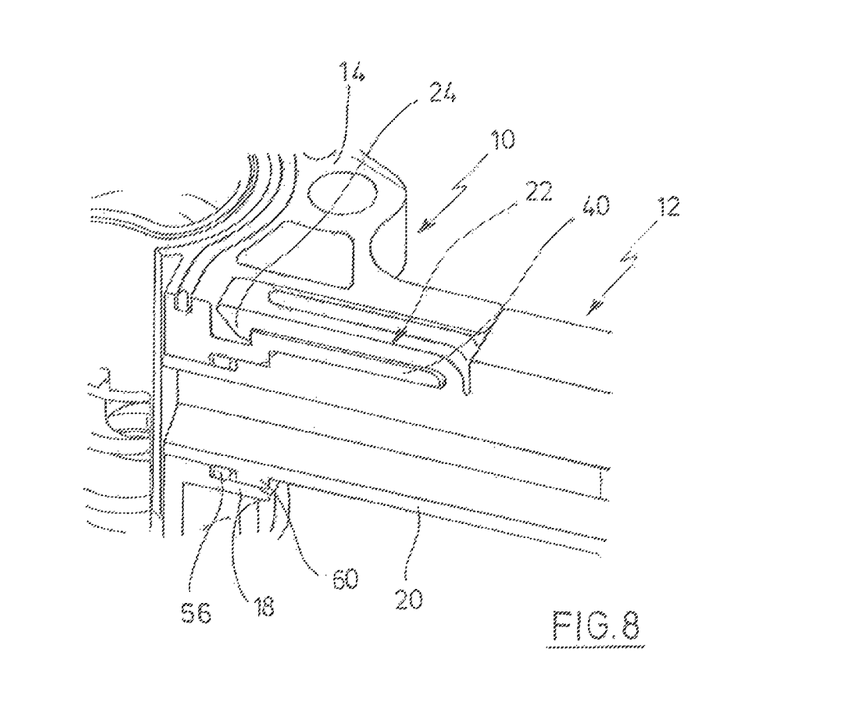
FIG. 8 is a partial section of the structure of FIG. 2 along line 8-8.

FIG. 4 shows the joined sub-assemblies of FIG. 3. As indicated, the pipe segment 18 comprises a terminal element 18 of larger diameter receiving the seal 50. The pipe segment 18 is fitted with a radial collar 60 which may be inserted at a tight fit into the larger-diameter segment. As indicated, the annular chamber subtended in this manner is larger in the axial direction than the diameter of the sealing ring 50. FIG. 4 also shows that a play denoted by 62 exists in both the axial and the radial directions between the tang 22 and the web 36.

Joining the sub-assemblies 10, 12 to each other is limited by stop faces, the sub-assembly 12 comprising one stop face, namely 70, and the sub-assembly 10 comprising several stop faces, namely 72, at the ends of the arms 36, 38. When the stop faces 70, 72 abut each other, the detent element 24 of the resilient tang snaps into position behind the shoulder 48. As indicated in FIG. 4, in that configuration the pipe segments 18, 20 have been telescoped into each other deeply enough. Henceforth the sub-assemblies 10, 12 can only be disengaged from each other when the resilient tang 22 shall be bent outwardly. While such disengagement is feasible in principle, it is impossible when the sub-assembly 10 is joined to the engine part. The above discussed connection can only become dissolved after the sub-assembly 10 has been removed from the engine. It is in this manner that one of the two sub-assemblies 10 or 12 may be exchanged if illustratively no longer operable.

The invention claimed is:

1. An internal combustion engine's cooling system comprising a coolant circuit, further a first sub-assembly configured in said circuit and fitted with a first pipe segment and a second sub-assembly in said circuit fitted with at least one second pipe segment, further a sealed connection between the pipe segments, either the first or the second sub-assembly being fitted with means for solidly joining it to an engine, characterized in that the pipe segments of the two sub-assemblies can be plugged into one another and are displaceable relative to each other, a seal being configured between the pipe segments, a resilient locking tang running parallel to the axis of the pipe segment of the second sub-assembly that is integral with said second sub-assembly and is fitted at its free end with a detent element pointing toward the second pipe segment, an elongated guide portion running parallel to and spaced from the locking tang between the second pipe segment and the locking tang is integral with the second sub-assembly, the first pipe segment having a pair of spaced-apart arms running parallel to each other and parallel to the axis of the first pipe segment wherein the spaced apart arms extend a length beyond the end of this first pipe segment and are integral with the first sub-assembly, the first pipe segment further comprising an axially parallel web positioned between the arms and configured to engage the guide portion of the second sub assembly and is fitted at its end facing the second sub-assembly with a detent shoulder which is engaged from behind by the detent element of the locking tang when the pipe segments are plugged into each other, the first and second sub assembly having respective terminal stop faces that limit the mutual displacement, and the resilient tang is received at a closed fit between the arms and wherein the elongated guide portion is guided by lateral guide faces of the arms.

2. Cooling system as claimed in claim 1, characterized in that a small surface which is part of the guide portion and which faces the locking tang rests against this portion at one side of the web or runs toward it to leave only a small gap between them when the pipe segments are plugged into each other.

3. Cooling system as claimed in claim 1, characterized in that the arms are each fitted with a respective resilient zone fitted with a first detent connection element at its free end the detent connection elements being situated opposite each other and comprising lateral guide faces of the guide portion each of a respective second detent connection element cooperating in locking manner with the first detent connection portions when the pipe segments are plugged into one another.

4. Cooling system as claimed in claim 1, characterized in that, following engaging the detent shoulder, the pipe segments and hence the sub-assemblies subtend an axial play.

5. Cooling system as claimed in claim 1, characterized in that a larger inside-diameter pipe segment comprises a terminal zone of larger diameter and a smaller outside-diameter pipe segment comprises a radial collar a distance from its free end, and that the sealing ring is received in the terminal zone of larger inside diameter.

6. Cooling system as claimed in claim 1, characterized in that both sub-assemblies are constituted by a thermostatic valve.

7. Cooling system as claimed in claim 1, characterized in that as regards to a sub-assembly connected to the engine, the locking tang of the second sub-assembly plugged together with the first sub-assembly is situated on a side of the mutually plugged-in sub-assemblies which faces said engine.

8. An internal combustion engine's cooling system comprising:
a coolant circuit;

a first sub-assembly configured in said circuit and fitted with a first pipe segment;

a second sub-assembly configured in said circuit fitted with at least one second pipe segment; and a sealed connection between the pipe segments, wherein either the first or the second sub-assembly is configured to be solidly joined to an engine, wherein the pipe segments of the two sub-assemblies are configured to be plugged into one another and are displaceable relative to each other, a seal is configured between the two sub-assemblies, a resilient locking tang running parallel to the axis of the second pipe segment is fitted at its free end with a detent element pointing toward the second pipe segment, an elongated guide portion running parallel to and spaced from the locking tang between the second pipe segment and the locking tang is part of the second sub-assembly, the first pipe segment includes spaced-apart arms running parallel to each other and parallel to the axis of the first pipe segment wherein the spaced apart arms extend a length beyond the end of this first pipe segment and are part of the first sub-assembly, and the first pipe segment further includes an axially parallel web located between the arms and configured to engage the guide portion of the second sub assembly and is fitted at its end, facing the second sub-assembly, with a detent shoulder which is engaged from behind by the detent element of the locking tang when the pipe segments are plugged into each other, the first and second sub assembly having respective terminal stop faces that limit the mutual displacement and the resilient tang is received at a closed fit between the arms and wherein the elongated guide is guided by lateral guide faces of the arms.

9. Cooling system as claimed in claim 8, wherein the spaced-apart arms are both located on one side of the axis of the first pipe segment.

10. Cooling system as claimed in claim 8, wherein the spaced-apart arms have longitudinal axes located on a different plane from that of the axis of the first pipe segment.

11. Cooling system as claimed in claim 8, wherein when the two sub-assemblies are plugged into one another, the two arms and the resilient tang are located on a same side of the first and second pipe segments.

12. Cooling system as claimed in claim 8, wherein when the two sub-assemblies are plugged into one another, the two arms collectively establish a female receptacle relative to the resilient tang.

13. Cooling system as claimed in claim 8, wherein the web extends in a plane that is offset from the axis of the first pipe segment.

14. Cooling system as claimed in claim 8, wherein a surface which is part of the guide portion and which faces the locking tang rests against this portion at one side of the web or runs toward it to leave only a small gap between them when the pipe segments are plugged into each other.

15. Cooling system as claimed in claim 8, wherein the arms are each fitted with a respective resilient zone fitted with a first detent connection element at its free end the detent connection elements being situated opposite each other and comprising lateral guide faces of the guide portion each of a respective second detent connection element cooperating in locking manner with the first detent connection portions when the pipe segments are plugged into one another.

16. Cooling system as claimed in claim 8, wherein following engaging the detent shoulder, the pipe segments and hence the sub-assemblies subtend an axial play.

17. Cooling system as claimed in claim 8, wherein a larger inside-diameter pipe segment comprises a terminal zone of larger diameter and a smaller outside-diameter pipe segment comprises a radial collar a distance from its free end, and that the sealing ring is received in the terminal zone of larger inside diameter.

* * * * *